United States Patent
Lee et al.

(10) Patent No.: US 9,300,887 B2
(45) Date of Patent: Mar. 29, 2016

(54) IMAGE SENSOR AND COMPUTING SYSTEM HAVING THE SAME

(71) Applicant: Samsung Electronics Co., Ltd., Suwon-si (KR)

(72) Inventors: Gwi-Deok Lee, Suwon-si (KR);
Kyung-Ho Lee, Suwon-si (KR);
Hiroshige Goto, Suwon-si (KR);
Sae-Young Kim, Yongin-si (KR);
Sang-Chul Sul, Suwon-si (KR);
Myung-Won Lee, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 14/256,106

(22) Filed: Apr. 18, 2014

(65) Prior Publication Data

US 2014/0313383 A1    Oct. 23, 2014

(30) Foreign Application Priority Data

Apr. 18, 2013   (KR) .................. 10-2013-0042681

(51) Int. Cl.
*H04N 5/355*    (2011.01)

(52) U.S. Cl.
CPC ......... *H04N 5/3559* (2013.01); *H04N 5/35509* (2013.01)

(58) Field of Classification Search
CPC ..... H04N 5/335; H04N 5/355; H04N 5/3559; H04N 5/35509; H04N 5/378; H04N 3/155
See application file for complete search history.

(56) References Cited

U.S. PATENT DOCUMENTS

| | | | |
|---|---|---|---|
| 7,372,492 B2 * | 5/2008 | Ahn | 348/308 |
| 7,920,189 B2 | 4/2011 | Goto | |
| 8,072,520 B2 * | 12/2011 | Rysinski | 348/296 |
| 8,792,030 B2 * | 7/2014 | Tanaka | 348/281 |
| 2003/0214595 A1 * | 11/2003 | Mabuchi | 348/294 |
| 2008/0079806 A1 | 4/2008 | Inuiya et al. | |
| 2009/0008665 A1 | 1/2009 | Lee et al. | |
| 2011/0049665 A1 | 3/2011 | Goto | |
| 2011/0216212 A1 | 9/2011 | Watanabe et al. | |
| 2012/0313142 A1 | 12/2012 | Suzuki et al. | |

FOREIGN PATENT DOCUMENTS

| | | |
|---|---|---|
| JP | 2006-094263 | 4/2006 |
| JP | 2008-085160 | 4/2008 |
| JP | 2012-151771 | 8/2012 |
| KR | 10-2012-0103912 A | 9/2012 |

* cited by examiner

*Primary Examiner* — Luong T Nguyen
(74) *Attorney, Agent, or Firm* — Myers Bigel & Sibley, PA

(57) ABSTRACT

An image sensor includes a photoelectric conversion unit, a signal generation unit, and a feedback unit. The photoelectric conversion unit is formed above a substrate and detects incident light to generate photo-charges based on a drive voltage. The signal generation unit is formed on the substrate and generates an analog signal based on the photo-charges. The feedback unit generates the drive voltage based on an amount of the photo-charges generated from the photoelectric conversion unit. The image sensor may perform a wide dynamic range (WDR) function.

14 Claims, 13 Drawing Sheets

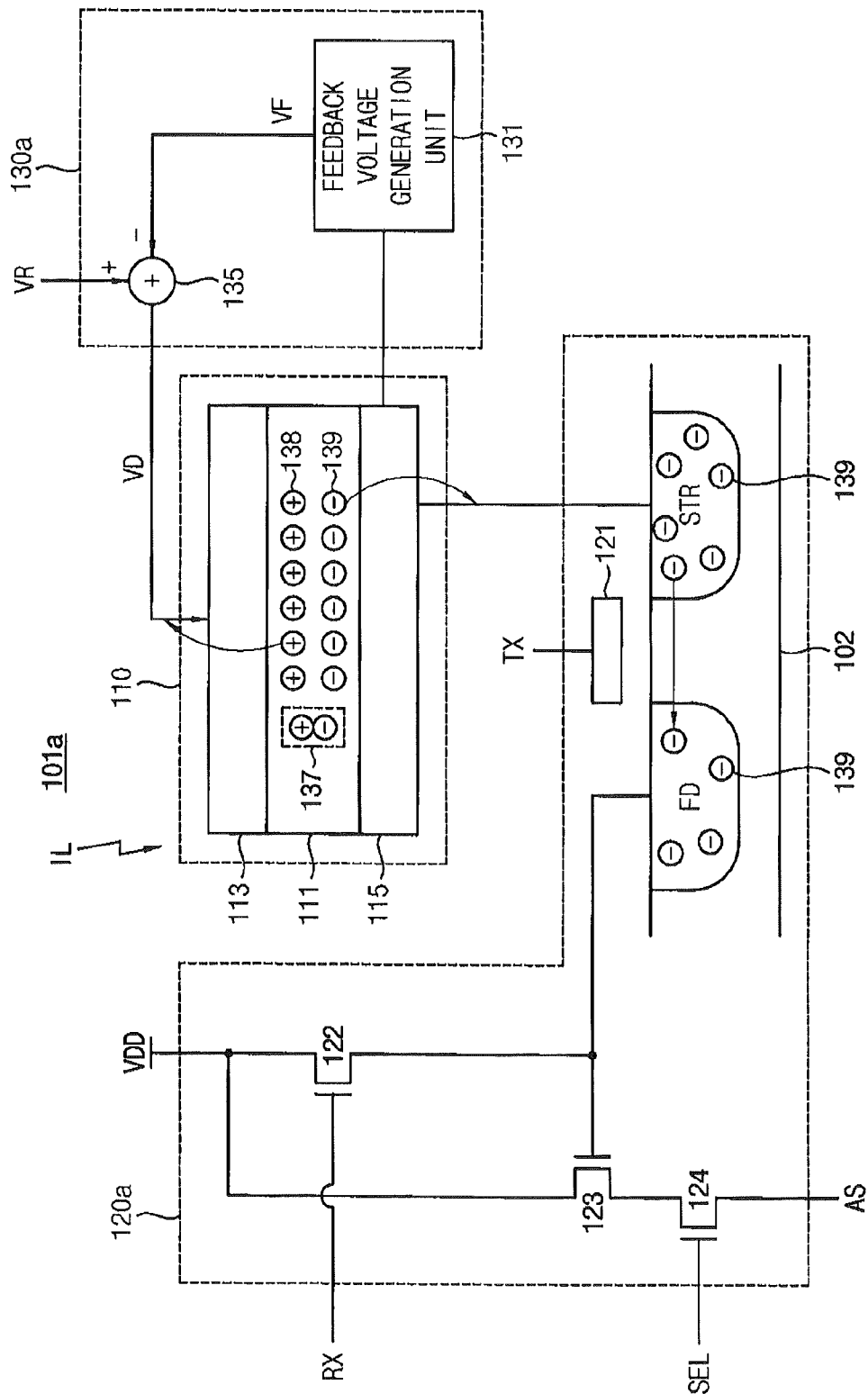

IMAGE SENSOR AND COMPUTING SYSTEM HAVING THE SAME

CROSS-REFERENCE TO RELATED APPLICATION

This application claims priority under 35 USC §119 to Korean Patent Application No. 10-2013-0042681, filed on Apr. 18, 2013 in the Korean Intellectual Property Office (KIPO), the contents of which are herein incorporated by reference in their entirety.

FIELD

Example embodiments relate to an image sensor, and, more particularly, to an image sensor having a wide dynamic range (WDR) function and a computing system including the image sensor.

BACKGROUND

Generally, if a sensitivity of an image sensor increases, a subject having a relatively high illuminance may be captured too bright to distinguish the subject, and if a sensitivity of an image sensor decreases, a subject having a relatively low illuminance may be captured too dark to distinguish the subject.

SUMMARY

Some example embodiments are directed to provide an image sensor for performing a wide dynamic range (WDR) function.

Some example embodiments are directed to provide a computing system including the image sensor.

According to example embodiments, an image sensor includes a photoelectric conversion unit, a signal generation unit, and a feedback unit. The photoelectric conversion unit is formed above a substrate and detects incident light to generate photo-charges based on a drive voltage. The signal generation unit is formed on the substrate and generates an analog signal based on the photo-charges. The feedback unit generates the drive voltage based on an amount of the photo-charges generated from the photoelectric conversion unit.

In example embodiments, the photoelectric conversion unit may include an organic photodiode having an organic material.

In example embodiments, the drive voltage may have a negative voltage.

In example embodiments, the amount of the photo-charges generated from the photoelectric conversion unit may be proportional to a magnitude of the drive voltage.

The feedback unit may decrease the magnitude of the drive voltage when the amount of the photo-charges increases, and increase the magnitude of the drive voltage when the amount of the photo-charges decreases.

In example embodiments, the photoelectric conversion unit may include an organic material layer including an organic material and configured to detect the incident light to generate the photo-charges, an upper electrode formed on the organic material layer and configured to receive the drive voltage, and a lower electrode formed under the organic material layer and configured to provide the photo-charges to the signal generation unit.

The feedback unit may include a feedback voltage generation unit coupled to the lower electrode of the photoelectric conversion unit and configured to generate a feedback voltage based on the amount of the photo-charges generated from the photoelectric conversion unit, and a voltage summing unit configured to generate the drive voltage corresponding to a voltage difference between a reference voltage and the feedback voltage.

The signal generation unit may include a transmission transistor including a source corresponding to a storage area storing the photo-charges provided from the lower electrode of the photoelectric conversion unit, a drain corresponding to a floating diffusion area, and a gate receiving a transmission control signal, a reset transistor including a source coupled to the floating diffusion area, a drain coupled to a supply voltage, and a gate receiving a reset control signal, a sensing transistor including a source, a drain coupled to the supply voltage, and a gate coupled to the floating diffusion area, and a row selection transistor including a drain coupled to the source of the sensing transistor, a gate receiving a row selection signal, and a source outputting the analog signal.

The signal generation unit may include a storage area configured to store the photo-charges provided from the lower electrode of the photoelectric conversion unit, an energy barrier area formed on a side of the storage area, and an overflow area formed on a side of the energy barrier area and configured to store photo-charges overflowing the energy barrier from the storage area.

The energy barrier area may include P type impurities having a relatively high density.

The feedback unit may include a feedback voltage generation unit coupled to the overflow area of the signal generation unit and configured to generate a feedback voltage based on an amount of the photo-charges stored in the overflow area, and a voltage summing unit configured to generate the drive voltage corresponding to a voltage difference between a reference voltage and the feedback voltage.

The image sensor may further include a switch configured to selectively provide a bias voltage to the overflow area of the signal generation unit in response to a bias control signal.

The signal generation unit may include a transmission transistor including a source corresponding to the storage area, a drain corresponding to a floating diffusion area, and a gate receiving a transmission control signal, a reset transistor including a source coupled to the floating diffusion area, a drain coupled to a supply voltage, and a gate receiving a reset control signal, a sensing transistor including a source, a drain coupled to the supply voltage, and a gate coupled to the floating diffusion area, and a row selection transistor including a drain coupled to the source of the sensing transistor, a gate receiving a row selection signal, and a source outputting the analog signal.

In example embodiments, the image sensor may further include an analog-digital conversion unit configured to convert the analog signal to a digital signal, and a control unit configured to control operations of the signal generation unit, the feedback unit and the analog-digital conversion unit.

According to example embodiments, a computing system includes an image sensor, a storage unit and a processor. The image sensor generates a digital signal corresponding to incident light. The storage unit stores the digital signal. The processor controls operations of the image sensor and the storage unit. The image sensor includes a photoelectric conversion unit formed above a substrate and configured to detect the incident light to generate photo-charges based on a drive voltage, a signal generation unit formed on the substrate and configured to generate an analog signal based on the photo-charges, a feedback unit configured to generate the drive voltage based on an amount of the photo-charges generated from the photoelectric conversion unit, and an analog-digital conversion unit configured to convert the analog signal to the digital signal.

BRIEF DESCRIPTION OF THE DRAWINGS

Illustrative, non-limiting example embodiments will be more clearly understood from the following detailed description in conjunction with the accompanying drawings.

FIG. 4 is a diagram for describing an operation of a unit pixel of FIG. 2.

DETAILED DESCRIPTION OF THE EMBODIMENTS

Figure 1:
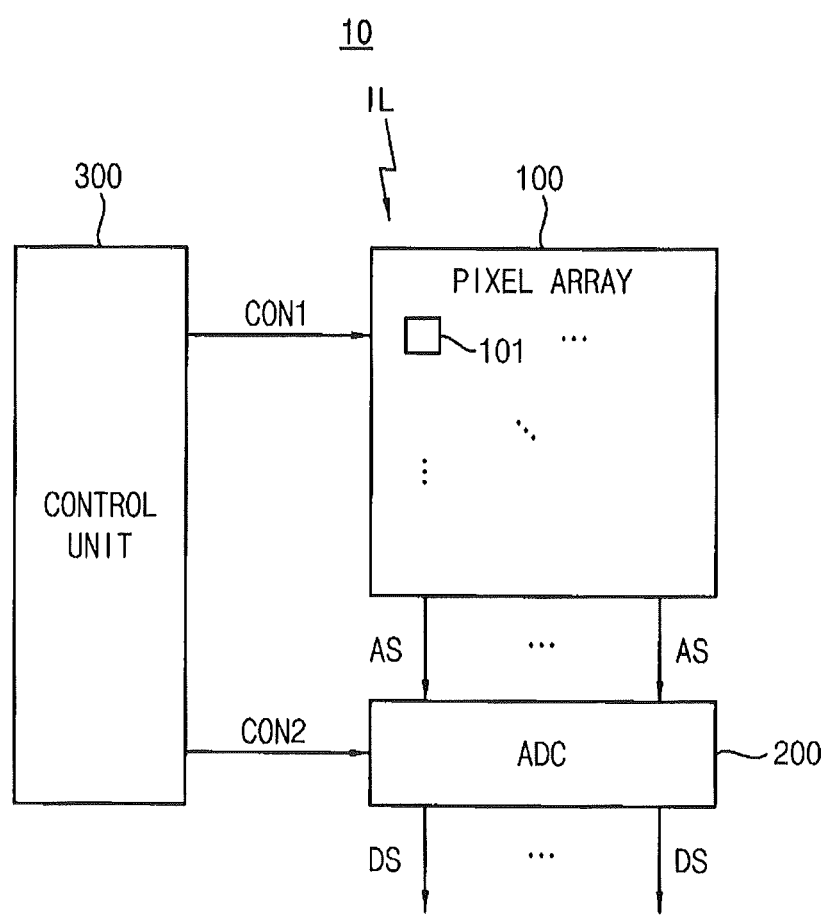
FIG. 1 is a block diagram illustrating an image sensor according to example embodiments.

Various example embodiments will be described more fully with reference to the accompanying drawings, in which some example embodiments are shown. The present inventive concept may, however, be embodied in many different forms and should not be construed as limited to the embodiments set forth herein. Rather, these embodiments are provided so that this disclosure will be thorough and complete, and will fully convey the scope of the present inventive concept to those skilled in the art. Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the inventive concept. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

FIG. 1 is a block diagram illustrating an image sensor according to example embodiments.

Referring to FIG. 1, an image sensor 10 includes a pixel array 100, an analog-digital conversion unit ADC 200, and a control unit 300.

The pixel array 100 includes a plurality of unit pixels 101 arranged in columns and rows. Each of the unit pixels 101 detects incident light IL and generates an analog signal AS in response to the incident light IL. For example, as an intensity of the incident light IL increases, a magnitude of the analog signal AS generated from each of the unit pixels 101 may increase, and as the intensity of the incident light IL decreases, the magnitude of the analog signal AS generated from each of the unit pixels 101 may decrease.

A sensitivity of each of the unit pixels 101 may be different from each other. In this application, a sensitivity of a unit pixel 101 represents a ratio of the magnitude of the analog signal AS generated from the unit pixel 101 responsive to the intensity of the incident light IL. Each of the unit pixels 101 includes a negative feedback path. Using the negative feedback loop, each of the unit pixels 101 may increase the sensitivity when the intensity of the incident light IL is relatively low and decrease the sensitivity when the intensity of the incident light IL is relatively high. Therefore, when an image having a relatively low illuminance and an image having a relatively high illuminance are captured at the same time, unit pixels 101 receiving the incident light IL corresponding to the image having a relatively low illuminance may increase the sensitivity and unit pixels 101 receiving the incident light IL corresponding to the image having a relatively high illuminance may decrease the sensitivity such that the image sensor 10 may implement a wide dynamic range (WDR) function. As such, the image sensor 10 may effectively capture an image having a relatively low illuminance and an image having a relatively high illuminance at the same time. A structure and an operation of the unit pixels 101 may be described later.

The analog-digital conversion unit 200 converts the analog signal AS provided from the pixel array 100 to a digital signal DS. In some example embodiments, the analog-digital conversion unit 200 may generate the digital signal DS by performing a single slope analog-digital conversion on the analog signal AS. In other example embodiments, the analog-digital conversion unit 200 may generate the digital signal DS by performing a sigma-delta analog-digital conversion on the analog signal AS. According to example embodiments, the analog-digital conversion unit 200 may generate the digital signal DS by performing various kinds of analog-digital conversions on the analog signal AS.

The control unit 300 controls an operation of the pixel array 100 using a first control signal CON1, and controls an operation of the analog-digital conversion unit 200 using a second control signal CON2. For example, the control unit 300 may control the operation of the pixel array 100 by a unit of a row.

Figure 2:
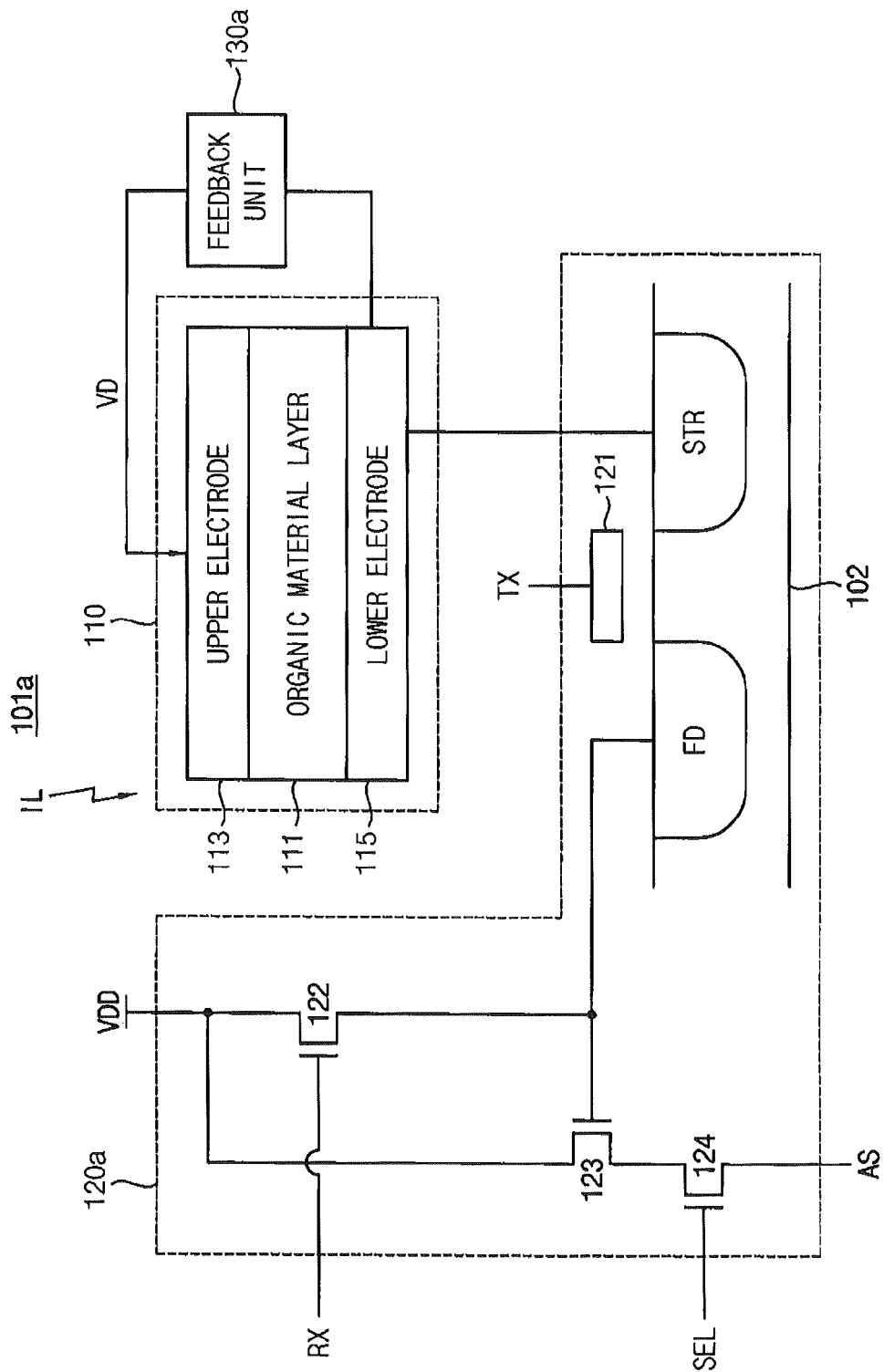
FIG. 2 is a diagram illustrating an example of a unit pixel included in an image sensor of FIG. 1.

FIG. 2 is a diagram illustrating an example of a unit pixel included in an image sensor of FIG. 1.

Referring to FIG. 2, a unit pixel 101*a* includes a photoelectric conversion unit 110, a signal generation unit 120*a*, and a feedback unit 130*a*.

The photoelectric conversion unit 110 is formed above a substrate 102. The photoelectric conversion unit 110 detects the incident light IL to generate the photo-charges based on, a drive voltage VD.

The signal generation unit 120*a* is formed on the substrate 102. The signal generation unit 120*a* generates the analog signal AS based on the photo-charges provided from the photoelectric conversion unit 110.

The feedback unit 130*a* generates the drive voltage VD based on an amount of the photo-charges generated from the photoelectric conversion unit 110 and provides the drive voltage VD to the photoelectric conversion unit 110. That is, the feedback unit 130*a* may provide a negative feedback path to the photoelectric conversion unit 110 such that the feedback unit 130*a* may control a magnitude of the drive voltage VD, which is provided to the photoelectric conversion unit 110, based on the amount of the photo-charges generated from the photoelectric conversion unit 110.

In some example embodiments, the amount of the photo-charges generated from the photoelectric conversion unit 110 may be proportional to the magnitude of the drive voltage VD. That is, when the intensity of the incident light IL is maintained at a constant level, as the magnitude of the drive voltage VD increases, the amount of the photo-charges generated from the photoelectric conversion unit 110 may increase such that the magnitude of the analog signal AS generated from the signal generation unit 120*a* may also increase.

Therefore, the feedback unit 130*a* may control the sensitivity of the unit pixel 101*a* by adjusting the magnitude of the drive voltage VD. In some example embodiments, the feedback unit 130*a* may decrease the magnitude of the drive voltage VD when the amount of the photo-charges generated from the photoelectric conversion unit 110 increases, and increase the magnitude of the drive voltage VD when the amount of the photo-charges generated from the photoelectric conversion unit 110 decreases. Therefore, the feedback unit 130*a* may increase the sensitivity of the unit pixel 101*a* when the intensity of the incident light IL is relatively low, and decrease the sensitivity of the unit pixel 101*a* when the intensity of the incident light IL is relatively high.

In some example embodiments, the photoelectric conversion unit 110 may include an organic photodiode having an organic material. For example, as illustrated in FIG. 2, the photoelectric conversion unit 110 may include an organic material layer 111, an upper electrode 113, and a lower electrode 115. The organic material layer 111 may include an organic material and detect the incident light IL to generate electron-hole pairs (EHPs). Electrons of the generated EHPs may correspond to the photo-charges. The upper electrode 113 may be formed on the organic material layer 111 and receive the drive voltage VD. The lower electrode 115 may be formed under the organic material layer 111 and be coupled to the signal generation unit 120*a*.

The drive voltage VD may have a negative voltage. Therefore, holes of the EHPs generated from the organic material layer 111 may be moved to the upper electrode 113 and the electrons of the EHPs generated from the organic material layer 111, which correspond to the photo-charges, may be moved to the lower electrode 115 because of the drive voltage VD having a negative voltage. The lower electrode 115 may provide the photo-charges to the signal generation unit 120*a*.

The signal generation unit 120*a* may include a transmission transistor 121, a reset transistor 122, a sensing transistor 123 and a row selection transistor 124.

Although the reset transistor 122, the sensing transistor 123 and the row selection transistor 124 are schematically illustrated in FIG. 2, the transmission transistor 121, the reset transistor 122, the sensing transistor 123, and the row selection transistor 124 are formed on the substrate 102. The transmission transistor 121, the reset transistor 122, the sensing transistor 123, and the row selection transistor 124 may be arranged in various forms on the substrate 102.

The transmission transistor 121 may include a source corresponding to a storage area STR storing the photo-charges provided from the lower electrode 115 of the photoelectric conversion unit 110, a drain corresponding to a floating diffusion area FD, and a gate receiving a transmission control signal TX.

The reset transistor 122 may include a source coupled to the floating diffusion area FD, a drain coupled to a supply voltage VDD, and a gate receiving a reset control signal RX.

The sensing transistor 123 may include a source coupled to a drain of the row selection transistor 124, a drain coupled to the supply voltage VDD, and a gate coupled to the floating diffusion area FD.

The row selection transistor 124 may include a drain coupled to the source of the sensing transistor 123, a gate receiving a row selection signal SEL, and a source outputting the analog signal AS.

The transmission control signal TX, the reset control signal RX, and the row selection signal SEL may be provided from the control unit 300 of FIG. 1.

Figure 3:
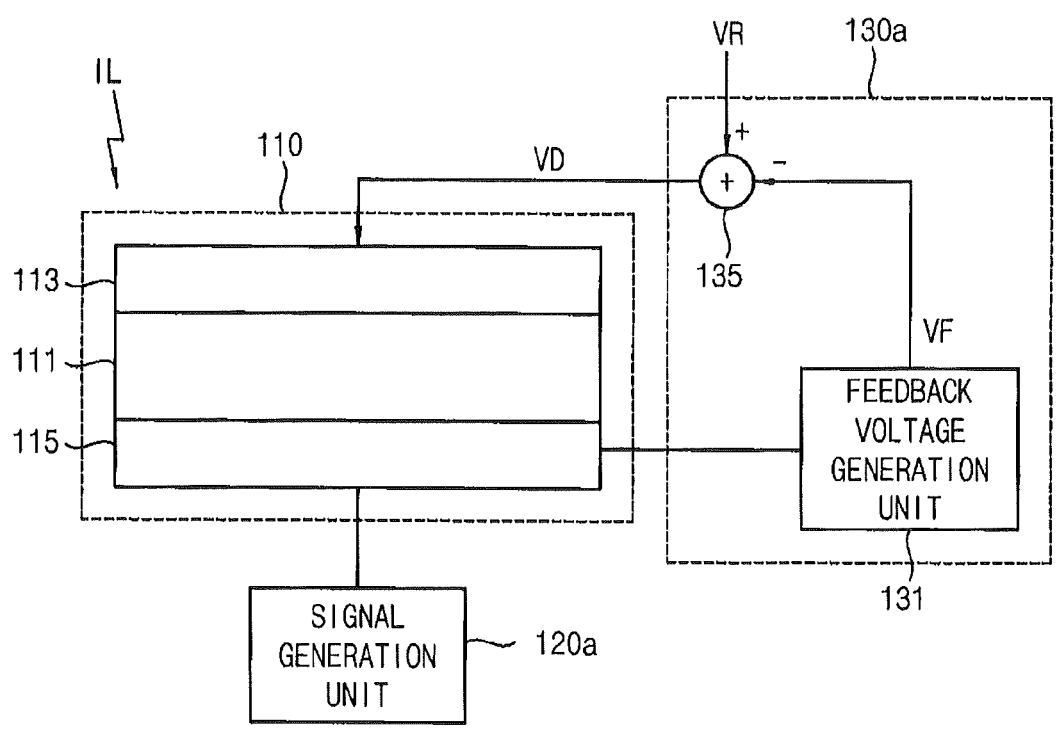
FIG. 3 is a diagram illustrating an example of a feedback unit included in a unit pixel of FIG. 2.

FIG. 3 is a diagram illustrating an example of a feedback unit included in a unit pixel of FIG. 2.

Referring to FIG. 3, the feedback unit 130*a* may include a feedback voltage generation unit 131 and a voltage summing unit 135.

The feedback voltage generation unit 131 may be coupled to the lower electrode 115 of the photoelectric conversion unit 110, and generate a feedback voltage VF based on the amount of the photo-charges generated from the photoelectric conversion unit 110. In some example embodiments, the feedback voltage generation unit 131 may output the supply voltage VDD as the feedback voltage VF when the amount of the photo-charges generated from the photoelectric conversion unit 110 is zero at start-up, and decrease a magnitude of the feedback voltage VF from the supply voltage VDD as the amount of the photo-charges generated from the photoelectric conversion unit 110 increases.

The voltage summing unit 135 may generate the drive voltage VD corresponding to a voltage difference between a reference voltage VR and the feedback voltage VF. In some example embodiments, the reference voltage VR may be a ground voltage. The voltage summing unit 135 may generate the drive voltage VD having a negative voltage by subtracting the feedback voltage VF from the reference voltage VR, and provide the drive voltage VD to the upper electrode 113 of the photoelectric conversion unit 110. Therefore, the magnitude of the drive voltage VD may correspond to a magnitude of the supply voltage VDD at start-up, and the magnitude of the drive voltage VD may decrease as the amount of the photo-charges generated from the photoelectric conversion unit 110 increases. A voltage range of the drive voltage VD may be controlled by adjusting a magnitude of the reference voltage VR. The reference voltage VR may be provided from the control unit 300 of FIG. 1.

FIG. 4 is a diagram for describing an operation of a unit pixel of FIG. 2, In FIG. 4, the feedback unit 130*a* is illustrated as having a structure of FIG. 3.

The organic material layer 111 of the photoelectric conversion unit 110 may detect the incident light IL to generate EHPs 137. As illustrated in FIG. 4, because the drive voltage VD having a negative voltage is applied to the upper electrode 113 of the photoelectric conversion unit 110, holes 138 of the EHPs 137 may be transferred to the feedback unit 130*a* through the upper electrode 113, and electrons 139 of the EHPs 137 may be transferred to the storage area STR of the signal generation unit 120*a* through the lower electrode 115. The electrons 139 of the EHPs 137 may correspond to the photo-charges generated from the photoelectric conversion unit 110. Therefore, the amount of the electrons 139 accumulated in the storage area STR may correspond to the intensity of the incident light IL.

The control unit 300 may select one of the rows included in the pixel array 100 by providing an activated row selection signal SEL to the selected row of the pixel array 100 to turn on the row selection transistor 124. The control unit 300 may provide an activated reset control signal RX to the selected row to turn on the reset transistor 122. Therefore, a voltage of the floating diffusion area FD may be initialized to the supply voltage VDD. After that, the control unit 300 may deactivate the reset control signal RX.

The control unit 300 may provide an activated transmission control signal TX to the transmission transistor 121 to turn on the transmission transistor 121, and then the electrons 139 accumulated in the storage area STR may be transferred to the floating diffusion area FD. A voltage of the floating diffusion area FD, which is a voltage of the gate of the sensing transistor 123, may be changed in response to an amount of the electrons 139 transferred to the floating diffusion area FD. If the row selection transistor 124 is turned on, the analog signal AS corresponding to the voltage of the floating diffusion area FD may be output from the unit pixel 101*a*.

After that, the control unit 300 may activate the reset control signal RX again to turn on the reset transistor 122 so that the voltage of the floating diffusion area FD may be the supply voltage VDD.

The control unit 300 and the pixel array 100 may repeat the above described operations to generate the analog signal AS row by row.

As described above, the feedback voltage generation unit 131 may generate the feedback voltage VF based on the amount of the photo-charges (that is, the electrons 139) generated from the photoelectric conversion unit 110, and the voltage summing unit 135 may generate the drive voltage VD corresponding to the voltage difference between the reference voltage VR and the feedback voltage VF and provide the drive voltage VD to the upper electrode 113 of the photoelectric conversion unit 110. Therefore, the feedback unit 130*a* may control the sensitivity of the unit pixel 101*a* by adjusting the magnitude of the drive voltage VD based on the amount of the photo-charges generated from the photoelectric conversion unit 110.

In this way, each unit pixel 101*a* included in the pixel array 100 may control the sensitivity independently based on the intensity of the incident light IL. That is, the image sensor 10 may set the sensitivities of the unit pixels 101*a* included in the pixel array 100 separately according to the intensity of the incident light IL for each unit pixel 101*a*. Therefore, when an image having a relatively low illuminance and an image having a relatively high illuminance are captured at the same time, the image sensor 10 may increase the sensitivity of the unit pixels 101*a* receiving the incident light IL corresponding to the image having a relatively low illuminance and decrease the sensitivity of the unit pixels 101*a* receiving the incident light IL corresponding to the image having a relatively high illuminance such that the image sensor 10 may implement a wide dynamic range (WDR) function. As such, the image sensor 10 may effectively capture the image having a relatively low illuminance and the image having a relatively high illuminance at the same time.

In addition, because the photoelectric conversion unit 110 is formed above the substrate 102, a size of the substrate 102 may be reduced such that the overall size of the image sensor 10 may be reduced.

Figure 5A:
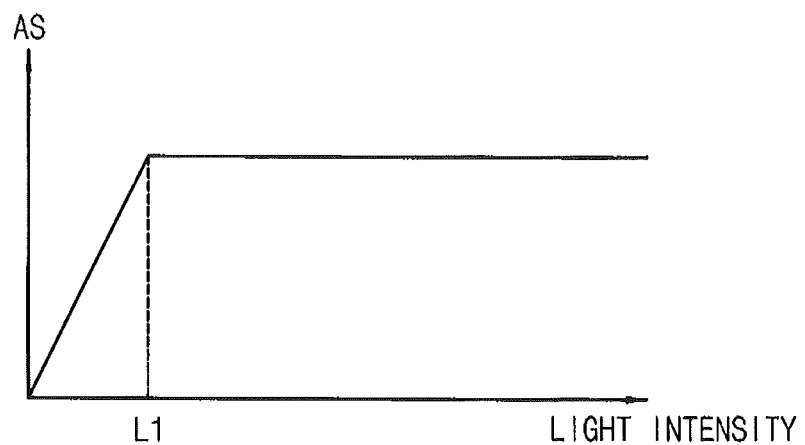
FIGS. 5A, 5B and 5C are graphs for describing an effect of a unit pixel of FIG. 2.
Figure 5B:
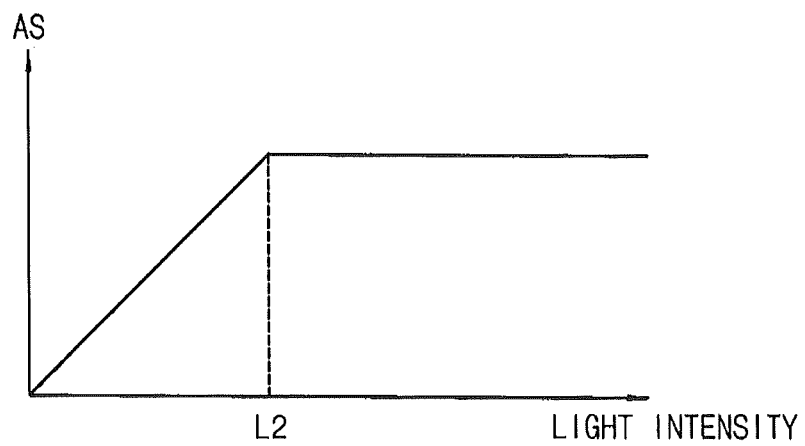
Figure 5C:
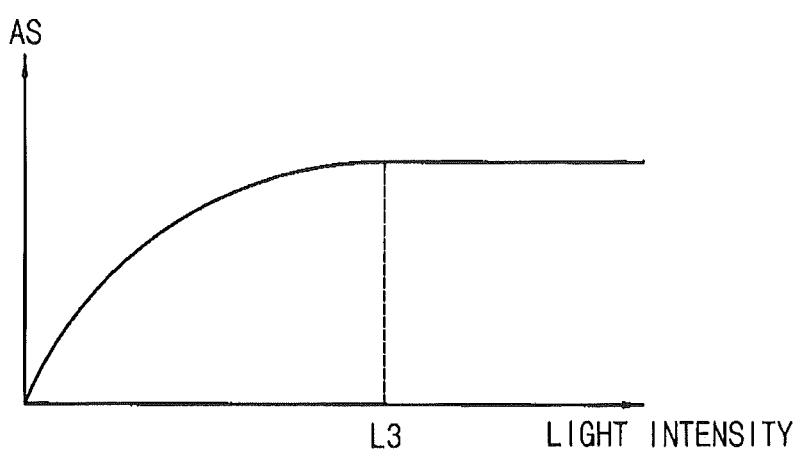

FIGS. 5A, 5B and 5C are graphs for describing an effect of a unit pixel of FIG. 2.

The graph of FIG. 5A represents a relation between an intensity of incident light and a magnitude of an analog signal generated from a unit pixel of a conventional image sensor when a sensitivity of the unit pixel is fixed to a relatively high value.

The graph of the FIG. 5B represents a relation between an intensity of incident light and a magnitude of an analog signal generated from a unit pixel of a conventional image sensor when a sensitivity of the unit pixel is fixed to a relatively low value.

The graph of the FIG. 5C represents a relation between the intensity of incident light IL and the magnitude of the analog signal AS generated from the unit pixel 101*a* of the image sensor 10 according to example embodiments.

Referring to FIG. 5A, because the sensitivity of the unit pixel is relatively high, a ratio of the magnitude of the analog signal to the intensity of the incident light is relatively high. Therefore, the unit pixel may be saturated at a relatively low illuminance (that is, a first illuminance L1) of the incident light. As such, when the sensitivity of the unit pixel is fixed to a relatively high value, the conventional image sensor may not be able to capture a subject correctly if the subject has a higher illuminance than the first illuminance L1.

Referring to FIG. 5B, because the sensitivity of the unit pixel is relatively low, a ratio of the magnitude of the analog signal to the intensity of the incident light is relatively low, Therefore, although the unit pixel may be saturated at a relatively high illuminance (that is, a second illuminance L2) of the incident light, a subject having a relatively low illuminance may be captured too dark to distinguish the subject.

However, as described above, each of the unit pixels 101*a* included in the image sensor 10 according to example embodiments may include the feedback unit 130*a*. Therefore, each unit pixel 101*a* may increase the sensitivity when the intensity of the incident light IL is relatively low and decrease the sensitivity when the intensity of the incident light IL is relatively high independently such that the image sensor 10 may implement a wide dynamic range (WDR) function. As illustrated in FIG. 5C, the unit pixel 101*a* may have a high sensitivity when the intensity of the incident light IL is relatively low, and may not be saturated until a relatively high illuminance (that is, a third illuminance L3) of the incident light IL. Therefore, the image sensor 10 may provide an image having high quality for both a subject having a low illuminance and a subject having a high illuminance.

Figure 6:
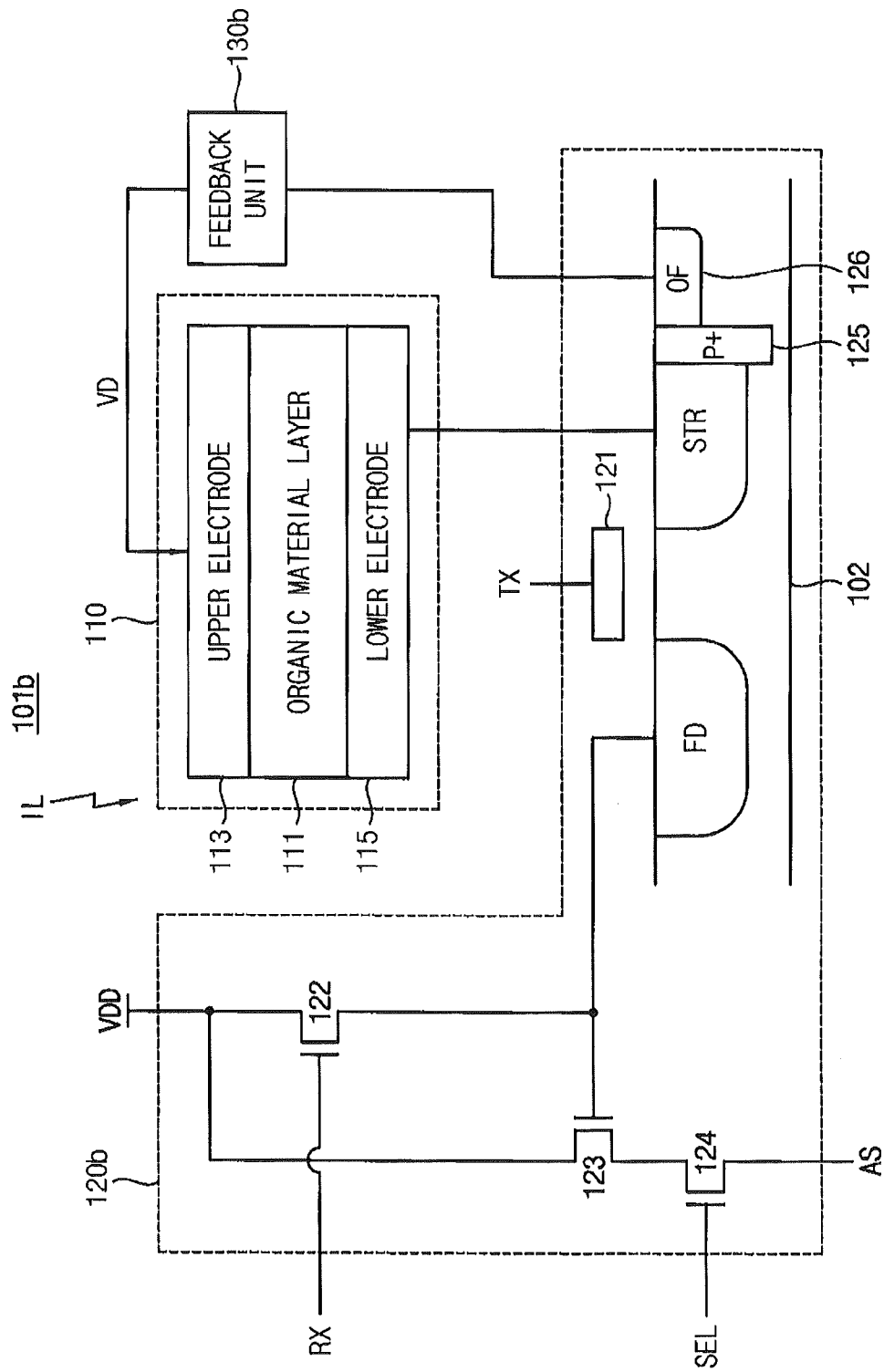
FIG. 6 is a diagram illustrating another example of a unit pixel included in an image sensor of FIG. 1.

FIG. 6 is a diagram illustrating another example of a unit pixel included in an image sensor of FIG. 1.

Referring to FIG. 6, a unit pixel 101b includes the photoelectric conversion unit 110, a signal generation unit 120b, and a feedback unit 130b.

The photoelectric conversion unit 110 is formed above the substrate 102. The photoelectric conversion unit 110 detects the incident light IL to generate the photo-charges based on the drive voltage VD. The drive voltage VD may have a negative voltage.

A structure and an operation of the photoelectric conversion unit 110 included in the unit pixel 101b of FIG. 6 may be the same as the photoelectric conversion unit 110 included in the unit pixel 101a of FIG. 2. Therefore, a detailed description of the photoelectric conversion unit 110 of FIG. 6 will be omitted.

The signal generation unit 120b may include the transmission transistor 121, the reset transistor 122, the sensing transistor 123, the row selection transistor 124, an energy barrier area 125, and an overflow area OF 126.

Although the reset transistor 122, the sensing transistor 123, and the row selection transistor 124 are schematically illustrated in FIG. 6, the transmission transistor 121, the reset transistor 122, the sensing transistor 123, the row selection transistor 124, the energy barrier area 125, and the overflow area 126 are formed on the substrate 102. The transmission transistor 121, the reset transistor 122, the sensing transistor 123, and the row selection transistor 124 may be arranged in various forms on the substrate 102.

The transmission transistor 121 may include a source corresponding to the storage area STR storing the photo-charges provided from the lower electrode 115 of the photoelectric conversion unit 110, a drain corresponding to the floating diffusion area FD, and a gate receiving the transmission control signal TX.

The reset transistor 122 may include a source coupled to the floating diffusion area FD, a drain coupled to the supply voltage VDD, and a gate receiving the reset control signal RX.

The sensing transistor 123 may include a source coupled to a drain of the row selection transistor 124, a drain coupled to the supply voltage VDD, and a gate coupled to the floating diffusion area FD.

The row selection transistor 124 may include a drain coupled to the source of the sensing transistor 123, a gate receiving the row selection signal SEL, and a source outputting the analog signal AS.

The transmission control signal TX, the reset control signal RX, and the row selection signal SEL may be provided from the control unit 300 of FIG. 1.

As illustrated in FIG. 6, the energy barrier area 125 may be formed on a side of the storage area STR, and the overflow area 126 may be formed on a side of the energy barrier area 125. That is, the energy barrier area 125 may be formed between the storage area STR and the overflow area 126. The energy barrier area 125 may include P type impurities P+ having a relatively high density. Therefore, the energy barrier area 125 may prevent the photo-charges accumulated in the storage area STR from transferring to the overflow area 126 until the photo-charges are accumulated in the storage area STR to a predetermined amount. When the photo-charges are accumulated in the storage area STR to the predetermined amount, the photo-charges may overflow the energy barrier area 125 to the overflow area 126. The overflow area 126 may store the photo-charges overflowing the energy barrier area 125 from the storage area STR.

The feedback unit 130b generates the drive voltage VD based on the amount of the photo-charges generated from the photoelectric conversion unit 110 and provides the drive voltage VD to the photoelectric conversion unit 110. That is, the feedback unit 130b may provide a negative feedback path to the photoelectric conversion unit 110 such that the feedback unit 130b may control the magnitude of the drive voltage VD, which is provided to the photoelectric conversion unit 110, based on the amount of the photo-charges generated from the photoelectric conversion unit 110. As illustrated in FIG. 6, the feedback unit 130b may be coupled between the overflow area 126 and the upper electrode 113 of the photoelectric conversion unit 110. The feedback unit 130b may generate the drive voltage VD based on an amount of the photo-charges that overflow the energy barrier area 125 from the storage area STR to the overflow area 126.

In some example embodiments, the amount of the photo-charges generated from the photoelectric conversion unit 110 may be proportional to the magnitude of the drive voltage VD. That is, when the intensity of the incident light IL is maintained at a constant level, as the magnitude of the drive voltage VD increases, the amount of the photo-charges generated from the photoelectric conversion unit 110 may increase such that the magnitude of the analog signal AS generated from the signal generation unit 120b may also increase.

Therefore, the feedback unit 130b may control the sensitivity of the unit pixel 101b by adjusting the magnitude of the drive voltage VD. In some example embodiments, the feedback unit 130b may decrease the magnitude of the drive voltage VD when the amount of the photo-charges that overflow the energy barrier area 125 from the storage area STR to the overflow area 126 increases, and increase the magnitude of the drive voltage VD when the amount of the photo-charges that overflow the energy barrier area 125 from the storage area STR to the overflow area 126 decreases. Therefore, the feedback unit 130b may increase the sensitivity of the unit pixel 101b when the intensity of the incident light IL is relatively low, and decrease the sensitivity of the unit pixel 101b when the intensity of the incident light IL is relatively high.

Figure 7:
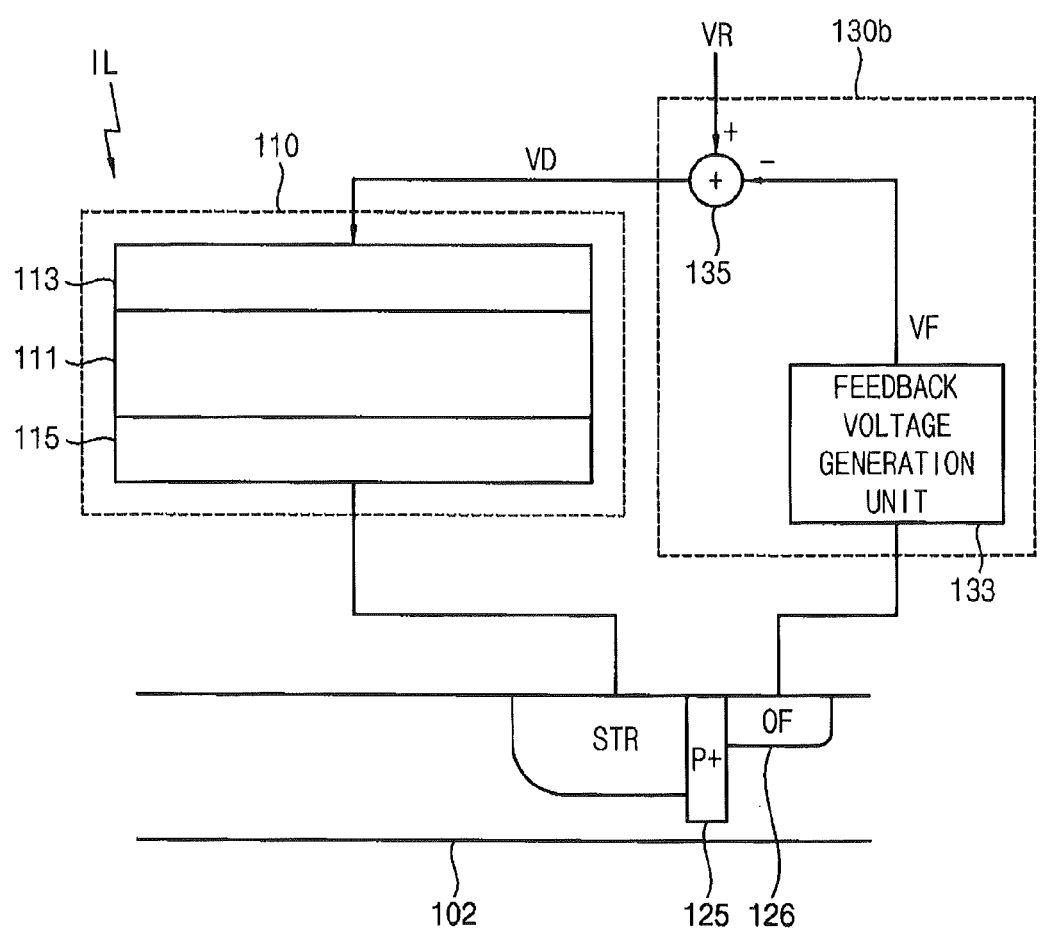
FIG. 7 is a diagram illustrating an example of a feedback unit included in a unit pixel of FIG. 6.

FIG. 7 is a diagram illustrating an example of a feedback unit included in a unit pixel of FIG. 6.

Referring to FIG. 7, the feedback unit 130b may include a feedback voltage generation unit 133 and the voltage summing unit 135.

The feedback voltage generation unit 133 may be coupled to the overflow area 126 of the signal generation unit 120b, and generate a feedback voltage VF based on the amount of the photo-charges overflowed the energy barrier area 125 from the storage area STR to the overflow area 126. In some example embodiments, the feedback voltage generation unit 133 may output the supply voltage VDD as the feedback voltage VF when the amount of the photo-charges overflowed the energy barrier area 125 from the storage area STR to the overflow area 126 is zero, and decrease a magnitude of the feedback voltage VF from the supply voltage VDD as the amount of the photo-charges overflowed the energy barrier area 125 from the storage area STR to the overflow area 126 increases.

The voltage summing unit 135 may generate the drive voltage VD corresponding to a voltage difference between the reference voltage VR and the feedback voltage VF. In some example embodiments, the reference voltage VR may be a ground voltage. The voltage summing unit 135 may generate the drive voltage VD having a negative voltage by subtracting the feedback voltage VF from the reference voltage VR, and provide the drive voltage VD to the upper electrode 113 of the photoelectric conversion unit 110.

As described above, the energy barrier area 125 may prevent the photo-charges accumulated in the storage area STR from transferring to the overflow area 126 until the photo-charges are accumulated in the storage area STR to the predetermined amount. Therefore, when the intensity of the incident light IL is lower than a predetermined value, the feedback voltage generation unit 133 may generate the feedback voltage VF having a constant magnitude, that is, a magnitude of the supply voltage VDD. When the intensity of the incident light IL increases over the predetermined value, the photo-charges may overflow the energy barrier area 125 from the storage area STR to the overflow area 126 and the magnitude of the drive voltage VD may decrease.

A voltage range of the drive voltage VD may be controlled by adjusting a magnitude of the reference voltage VR. The reference voltage VR may be provided from the control unit 300 of FIG. 1.

Figure 8:
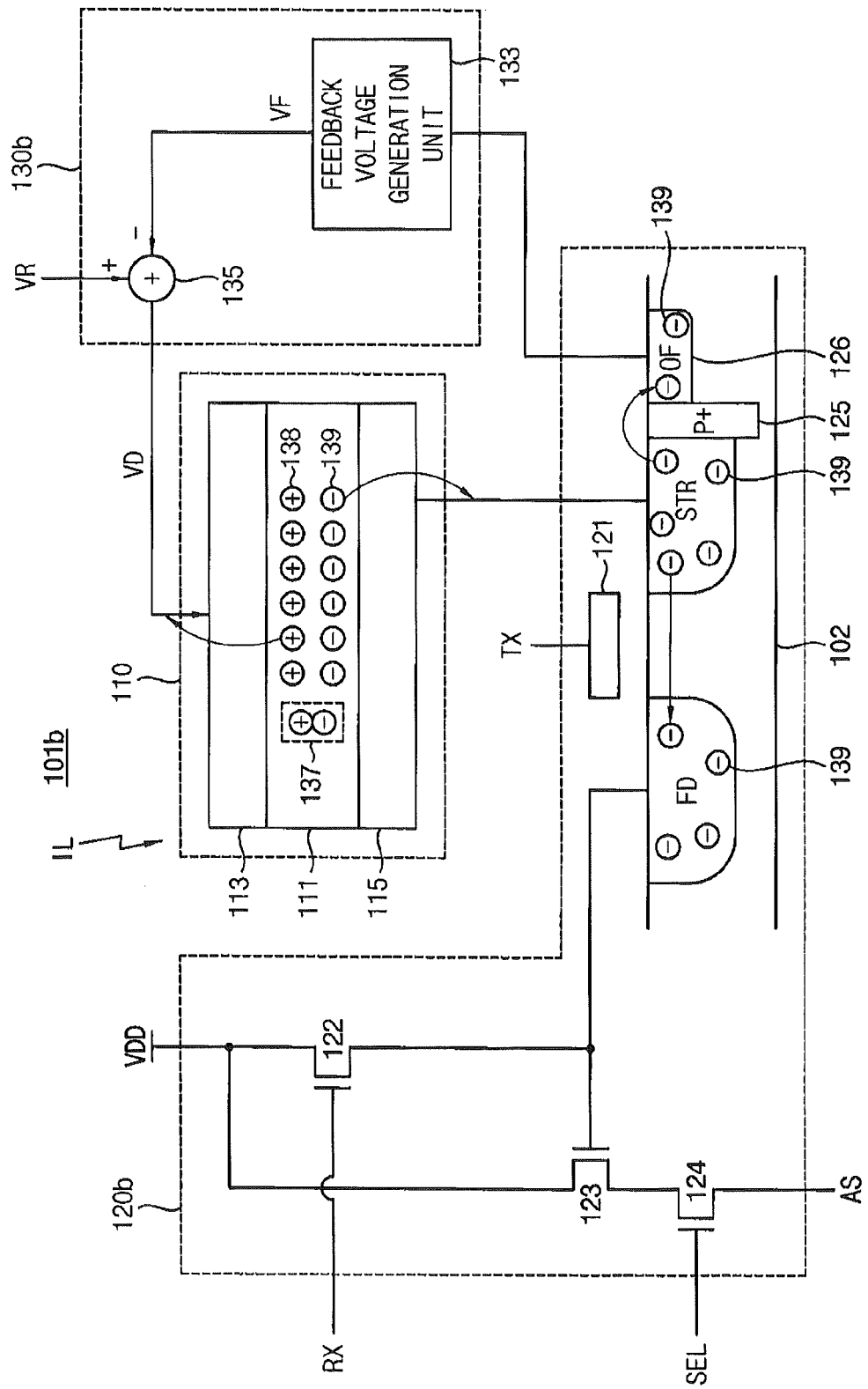
FIG. 8 is a diagram for describing an operation of a unit pixel of FIG. 6.

FIG. 8 is a diagram for describing an operation of a unit pixel of FIG. 6.

In FIG. 8, the feedback unit 130b is illustrated as having a structure of FIG. 7.

The organic material layer 111 of the photoelectric conversion unit 110 may detect the incident light IL to generate EHPs 137. As illustrated in FIG. 8, because the drive voltage VD having a negative voltage is applied to the upper electrode 113 of the photoelectric conversion unit 110, holes 138 of the EHPs 137 may be transferred to the feedback unit 130b through the upper electrode 113, and electrons 139 of the EHPs 137 may be transferred to the storage area STR of the signal generation unit 120b through the lower electrode 115. The electrons 139 of the EHPs 137 may correspond to the photo-charges generated from the photoelectric conversion unit 110. Therefore, the amount of the electrons 139 accumulated in the storage area STR may correspond to the intensity of the incident light IL.

The control unit 300 may select one of rows included in the pixel array 100 by providing an activated row selection signal SEL to the selected row of the pixel array 100 to turn on the row selection transistor 124. The control unit 300 may provide an activated reset control signal RX to the selected row to turn on the reset transistor 122. Therefore, a voltage of the floating diffusion area FD may be initialized to the supply voltage VDD. After that, the control unit 300 may deactivate the reset control signal RX.

The control unit 300 may provide an activated transmission control signal TX to the transmission transistor 121 to turn on the transmission transistor 121, and then the electrons 139 accumulated in the storage area STR may be transferred to the floating diffusion area FD. A voltage of the floating diffusion area FD, which is a voltage of the gate of the sensing transistor 123, may be changed in response to an amount of the electrons 139 transferred to the floating diffusion area FD. If the row selection transistor 124 is turned on, the analog signal AS corresponding to the voltage of the floating diffusion area FD may be output from the unit pixel 101b.

After that, the control unit 300 may activate the reset control signal RX again to turn on the reset transistor 115 so that the voltage of the floating diffusion area FD may be the supply voltage VDD.

The control unit 300 and the pixel array 100 may repeat the above described operations to generate the analog signal AS row by row.

As described above, the feedback voltage generation unit 133 may generate the feedback voltage VF based on the amount of the photo-charges (that is, the electrons 139) that overflow the energy barrier area 125 from the storage area STR to the overflow area 126, and the voltage summing unit 135 may generate the drive voltage VD corresponding to the voltage difference between the reference voltage VR and the feedback voltage VF and provide the drive voltage VD to the upper electrode 113 of the photoelectric conversion unit 110. Therefore, the feedback unit 130b may control the sensitivity of the unit pixel 101b by adjusting the magnitude of the drive voltage VD based on the amount of the photo-charges that overflow the energy barrier area 125 from the storage area STR to the overflow area 126.

In this way, each unit pixel 101b included in the pixel array 100 may control the sensitivity independently based on the intensity of the incident light IL. That is, the image sensor 10 may set the sensitivities of the unit pixels 101b included in the pixel array 100 separately according to the intensity of the incident light IL for each unit pixel 101b. Therefore, when an image having a relatively low illuminance and an image having a relatively high illuminance are captured at the same time, the image sensor 10 may increase the sensitivity of the unit pixels 101b receiving the incident light IL corresponding to the image having a relatively low illuminance and decrease the sensitivity of the unit pixels 101b receiving the incident light IL corresponding to the image having a relatively high illuminance such that the image sensor 10 may implement a wide dynamic range (WDR) function. As such, the image sensor 10 may effectively capture the image having a relatively low illuminance and the image having a relatively high illuminance at the same time.

In addition, the feedback unit 130b may maintain the magnitude of the drive voltage VD as the magnitude of the supply voltage VDD when the intensity of the incident light IL is lower than the predetermined value. Therefore, the unit pixel 101b may be able to keep a high sensitivity when the intensity of the incident light IL is lower than the predetermined value, such that the image sensor 10 may provide an image having high quality for a subject having a low illuminance.

In addition, because the photoelectric conversion unit 110 is formed above the substrate 102, a size of the substrate 102 may be reduced such that the overall size of the image sensor 10 may be reduced.

Figure 9:
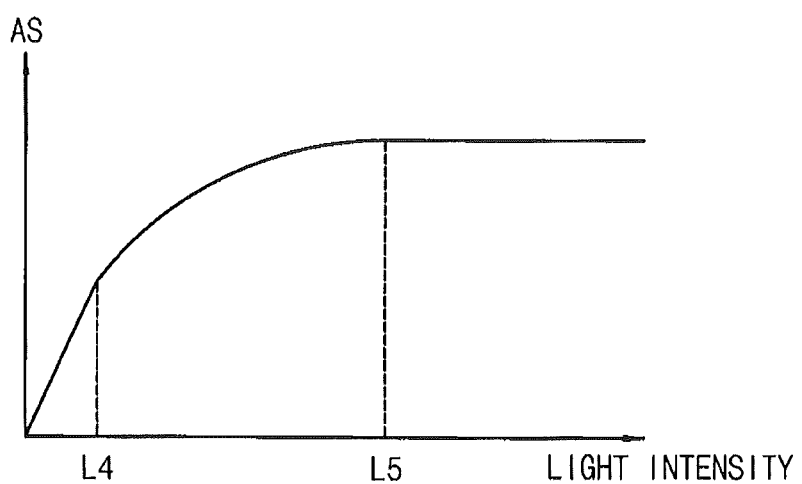
FIG. 9 is a graph for describing an effect of a unit pixel of FIG. 6.

FIG. 9 is a graph for describing an effect of a unit pixel of FIG. 6.

As illustrated in FIG. 9, the unit pixel 101b may constantly keep a high sensitivity when the intensity of the incident light IL is lower than a fourth illuminance L4, and decrease the sensitivity when the intensity of the incident light IL increases over the fourth illuminance L4. Therefore, the unit pixel 101b may have a high sensitivity when the intensity of the incident light IL is relatively low, and may not be saturated until a relatively high illuminance (that is, a fifth illuminance L5) of the incident light IL. Therefore, the image sensor 10 may provide an image having high quality for both a subject having a low illuminance and a subject having a high illuminance.

Figure 10:
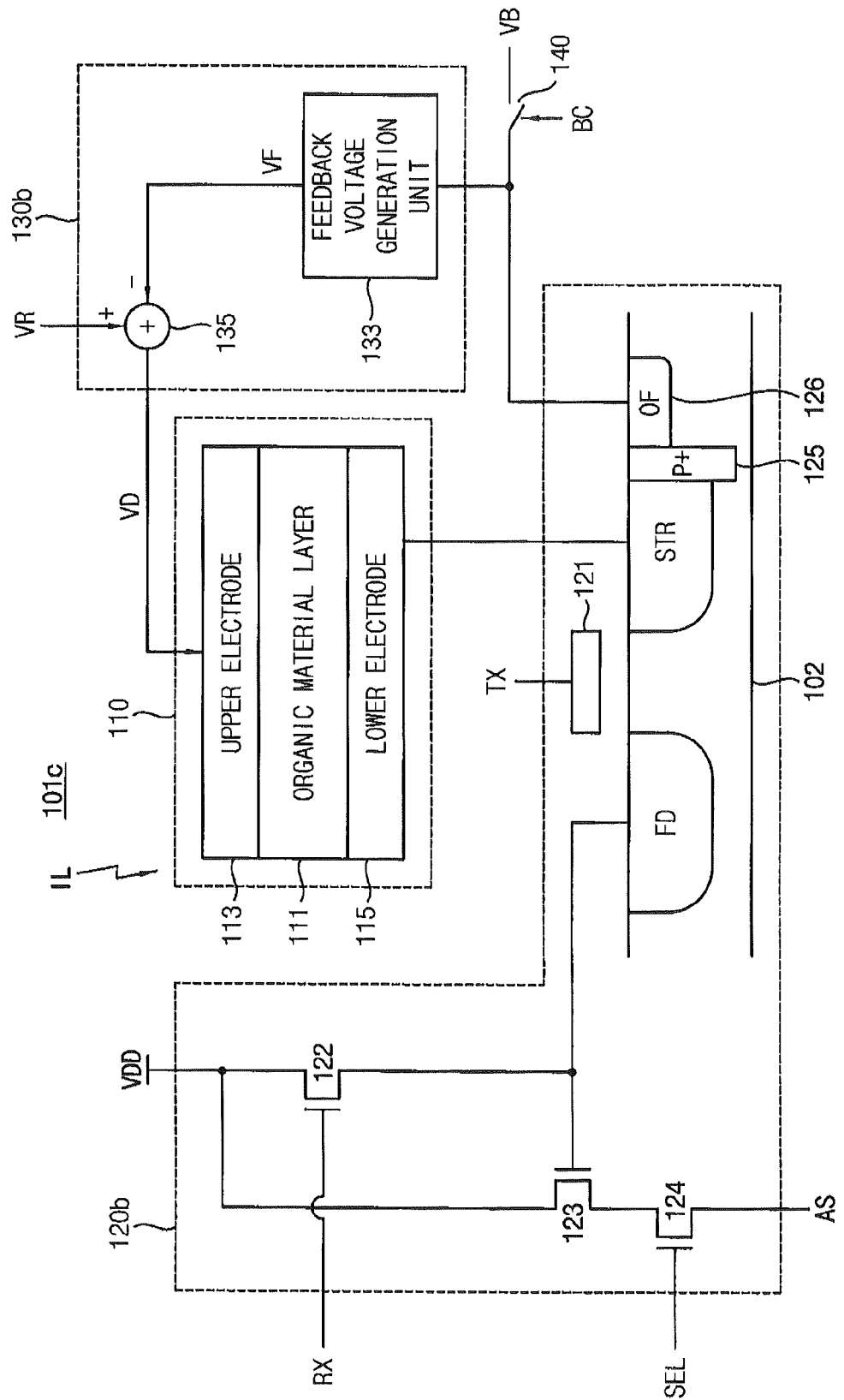
FIG. 10 is a diagram illustrating still another example of a unit pixel included in an image sensor of FIG. 1.

FIG. 10 is a diagram illustrating still another example of a unit pixel included in an image sensor of FIG. 1.

Referring to FIG. 10, a unit pixel 101c includes the photoelectric conversion unit 110, the signal generation unit 120b, the feedback unit 130b, and a switch 140.

The unit pixel 101c of FIG. 10 may be the same as the unit pixel 101b of FIG. 6 except that the unit pixel 101c further includes the switch 140. Therefore, a duplicated description will be omitted.

The switch 140 may selectively provide a bias voltage VB to the overflow area 126 of the signal generation unit 120b in response to a bias control signal BC. For example, the switch 140 may be turned on to provide the bias voltage VB to the overflow area 126 when the bias control signal BC has a first logic level, and be turned off to disconnect the bias voltage VB from the overflow area 126 when the bias control signal BC has a second logic level. The first logic level may be a logic high level, and the second logic level may be a logic low level.

The bias control signal BC and the bias voltage VB may be provided from the control unit 300 of FIG. 1. For example, the control unit 300 may provide the bias control signal BC having the first logic level to the switch 140 at start-up to bias a voltage of the overflow area 126 to the bias voltage VB. Therefore, the feedback voltage generation unit 133 may output the bias voltage VB as the feedback voltage VF at start-up or when the intensity of the incident light IL is lower than a predetermined value, and the voltage summing unit 135 may generate the drive voltage VD having a magnitude of the bias voltage VB. Therefore, when the intensity of the incident light IL is lower than a predetermined value, the image sensor 10 may control the sensitivity of the unit pixel 101*c* by adjusting the magnitude of the bias voltage VB.

Figure 11:
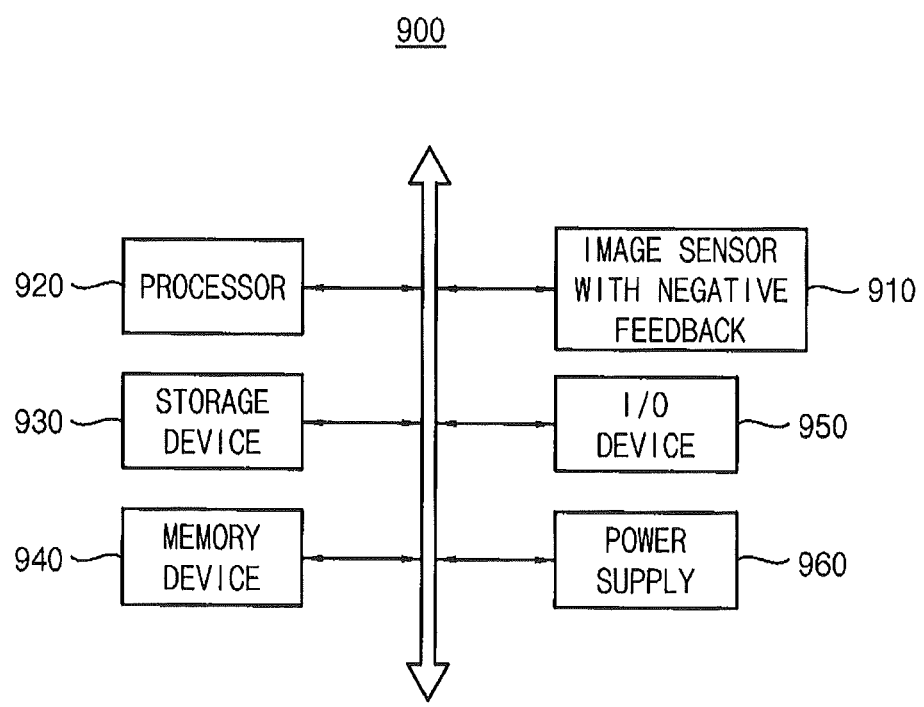
FIG. 11 is a block diagram illustrating a computing system including an image sensor according to an example embodiment.

FIG. 11 is a block diagram illustrating a computing system including an image sensor according to an example embodiment.

Referring to FIG. 11, a computing system 900 may include an image sensor 910, a processor 920, and a storage device 930.

The image sensor 910 may generate a digital signal corresponding to incident light. The storage device 930 may store the digital signal. The processor 920 may control operations of the image sensor 910 and the storage device 930.

The computing system 900 may further include a memory device 940, an input/output device 950, and a power supply 960. Although it is not illustrated in FIG. 11, the computing system 900 may further include ports that communicate with a video card, a sound card, a memory card, a universal serial bus (USB) device, or other electronic devices.

The processor 920 may perform various calculations or tasks. According to some embodiments, the processor 920 may be a microprocessor or a CPU. The processor 920 may communicate with the storage device 930, the memory device 940, and the input/output device 950 via an address bus, a control bus, and/or a data bus. In some example embodiments, the processor 920 may be coupled to an extended bus, such as a peripheral component interconnection (PCI) bus.

The storage device 930 may include a non-volatile memory device such as a flash memory device, a solid state drive (SSD), a hard disk drive (HDD), a compact disk read-only memory (CD-ROM) drive, etc.

The memory device 940 may store data used for operation of the electronic device 900. The memory device 940 may be a dynamic random access memory (DRAM), a static random access memory (SRAM), or a non-volatile memory, such as an erasable programmable read-only memory (EPROM), an electrically erasable programmable read-only memory (EEPROM), a flash memory, etc.

The input/output device 950 may include a touch screen, a keypad, a keyboard, a mouse, a printer, a display device, etc. The power supply 960 may supply operational power.

The image sensor 910 may be connected to the processor 920 through one or more of the above buses or other communication links to communicate with the processor 920.

A unit pixel included in the image sensor 901 includes a photoelectric conversion unit, a signal generation unit, a feedback unit, and an analog-digital conversion unit. The photoelectric conversion unit is formed above a substrate, and detects the incident light to generate photo-charges based on a drive voltage. The signal generation unit is formed on the substrate, and generates an analog signal based on the photo-charges provided from the photoelectric conversion unit. The feedback unit generates the drive voltage based on an amount of the photo-charges generated from the photoelectric conversion unit, and provides the drive voltage to the photoelectric conversion unit. The analog-digital conversion unit converts the analog signal provided from the signal generation unit to the digital signal.

The image sensor 910 may be embodied with the image sensor 10 of FIG. 1. A structure and operation of the image sensor 10 of FIG. 1 are described above with reference to FIGS. 1 to 10. Therefore, a detailed description of the image sensor 910 will be omitted.

The image sensor 910 may be packaged in various forms, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi chip package (MCP), wafer-level fabricated package (WFP), or wafer-level processed stack package (WSP).

According to example embodiments, the image sensor 910 may be integrated with the processor 920 in one chip, or the image sensor 910 and the processor 920 may be implemented as separate chips.

The computing system 900 may be any computing system using an image sensor. For example, the computing system 900 may include a digital camera, a mobile phone, a smart phone, a portable multimedia player (PMP), a personal digital assistant (PDA), etc.

Figure 12:
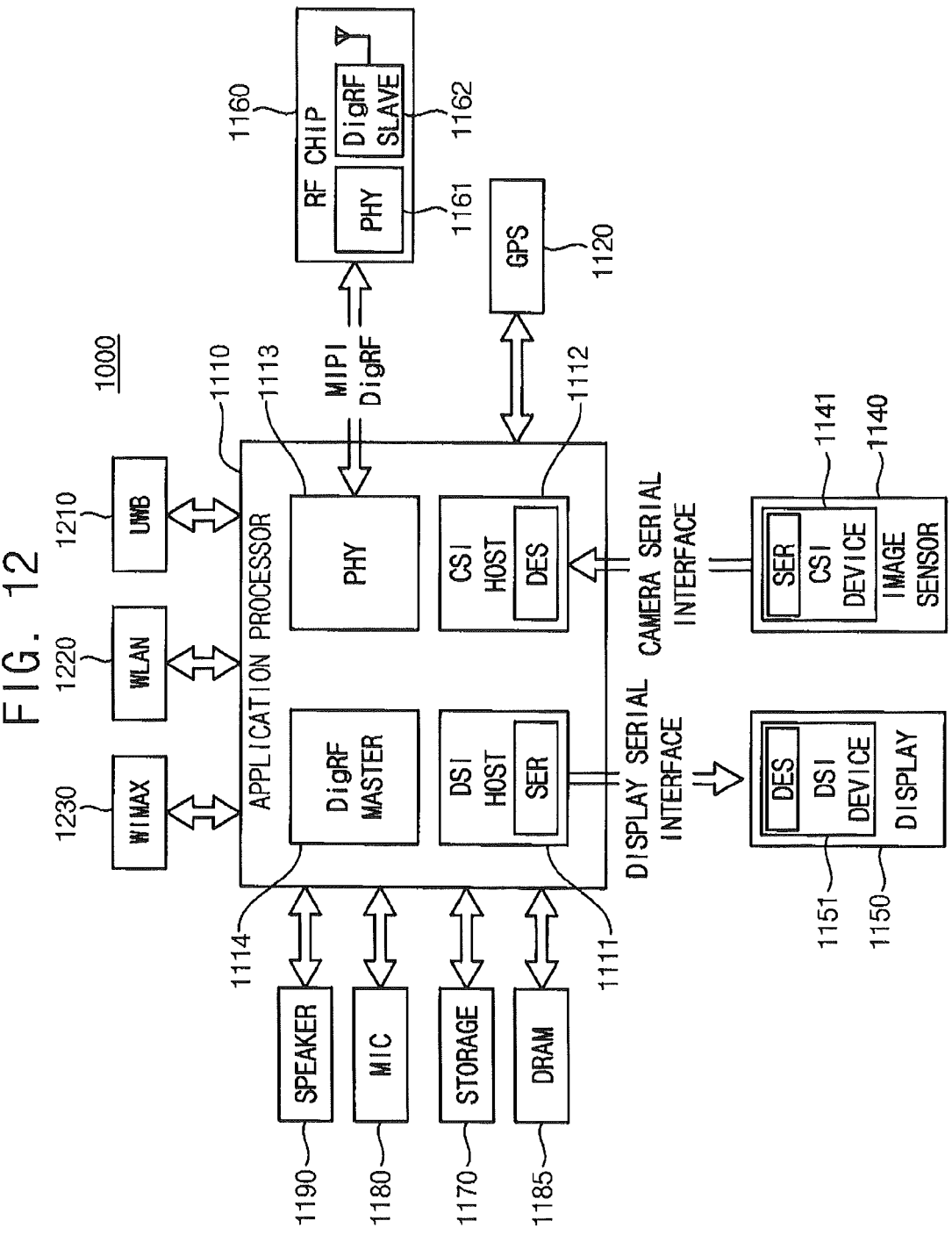
FIG. 12 is a block diagram illustrating an example of an interface used in the computing system of FIG. 11.

FIG. 12 is a block diagram illustrating an example of an interface used in the computing system of FIG. 11.

Referring to FIG. 12, a computing system 1000 may be implemented by a data processing device (e.g., a cellular phone, a personal digital assistant, a portable multimedia player, a smart phone, etc.) that uses or supports a mobile industry processor interface (MIPI) interface. The computing system 1000 may include an application processor 1110, an image sensor 1140, a display device 1150, etc.

A CSI host 1112 of the application processor 1110 may perform serial communication with a CSI device 1141 of the image sensor 1140 via a camera serial interface (CSI). In some embodiments, the CSI host 1112 may include a deserializer (DES), and the CSI device 1141 may include a serializer (SER). A DSI host 1111 of the application processor 1110 may perform a serial communication with a DSI device 1151 of the display device 1150 via a display serial interface (DSI). In some example embodiments, the DSI host 1111 may include a serializer (SER), and the DSI device 1151 may include a deserializer (DES).

The computing system 1000 may further include a radio frequency (RF) chip 1160 performing communication with the application processor 1110. A physical layer (PHY) 1113 of the computing system 1000 and a physical layer (PHY) 1161 of the RF chip 1160 may perform data communications based on a MIPI DigRF. The application processor 1110 may further include a DigRF MASTER 1114 that controls the data communications according to the MIPI DigRF of the PHY 1161, and the RF chip 1160 may further include a DigRF SLAVE 1162 controlled by the DigRF MASTER 1114.

The computing system 1000 may further include a global positioning system (GPS) 1120, a storage 1170, a MIC 1180, a DRAM device 1185, and a speaker 1190. In addition, the computing system 1000 may perform communications using an ultra wideband (UWB) 1210 interface, a wireless local area network (WLAN) 1220, a worldwide interoperability for microwave access (WIMAX) 1230 interface, etc. However, the structure and the interface of the computing system 1000 are not limited thereto.

The foregoing is illustrative of the present inventive concept and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. An image sensor, comprising:
    a photoelectric conversion unit formed above a substrate and configured to detect incident light to generate photo-charges based on a drive voltage;
    a signal generation unit formed on the substrate and configured to generate an analog signal based on the photo-charges; and
    a feedback unit to generate the drive voltage based on an amount of the photo-charges generated from the photoelectric conversion unit;
    wherein the photoelectric conversion unit includes:
    an organic material layer including an organic material and configured to detect the incident light to generate the photo-charges;
    an upper electrode formed on the organic material layer and configured to receive the drive voltage; and
    a lower electrode formed under the organic material layer and configured to provide the photo-charges to the signal generation unit;
    wherein the feedback unit comprises:
    a feedback voltage generation unit coupled to the lower electrode of the photoelectric conversion unit and to generate a feedback voltage based on the amount of the photo-charges generated from the photoelectric conversion unit; and
    a voltage summing unit to generate the drive voltage corresponding to a voltage difference between a reference voltage and the feedback voltage.

2. The image sensor of claim 1, wherein the drive voltage has a negative voltage.

3. The image sensor of claim 1, wherein the amount of the photo-charges generated from the photoelectric conversion unit is proportional to a magnitude of the drive voltage.

4. The image sensor of claim 3, wherein the feedback unit decreases the magnitude of the drive voltage when the amount of the photo-charges increases, and increases the magnitude of the drive voltage when the amount of the photo-charges decreases.

5. The image sensor of claim 1, wherein the signal generation unit comprises:
    a transmission transistor including a source corresponding to a storage area storing the photo-charges provided from the lower electrode of the photoelectric conversion unit, a drain corresponding to a floating diffusion area, and a gate receiving a transmission control signal;
    a reset transistor including a source coupled to the floating diffusion area, a drain coupled to a supply voltage, and a gate receiving a reset control signal;
    a sensing transistor including a source, a drain coupled to the supply voltage, and a gate coupled to the floating diffusion area; and
    a row selection transistor including a drain coupled to the source of the sensing transistor, a gate receiving a row selection signal, and a source outputting the analog signal.

6. The image sensor of claim 1, wherein the signal generation unit comprises:
    a storage area configured to store the photo-charges provided from the lower electrode of the photoelectric conversion unit;
    an energy barrier area formed on a side of the storage area; and
    an overflow area formed on a side of the energy barrier area and configured to store photo-charges overflowing the energy barrier from the storage area.

7. The image sensor of claim 6, wherein the energy barrier area includes P type impurities having a relatively high density.

8. The image sensor of claim 6, wherein the feedback unit comprises:
    a feedback voltage generation unit coupled to the overflow area of the signal generation unit and to generate a feedback voltage based on an amount of the photo-charges stored in the overflow area; and
    a voltage summing unit to generate the drive voltage corresponding to a voltage difference between a reference voltage and the feedback voltage.

9. The image sensor of claim 8, further comprising:
    a switch configured to selectively provide a bias voltage to the overflow area of the signal generation unit in response to a bias control signal.

10. The image sensor of claim 6, wherein the signal generation unit comprises:
    a transmission transistor including a source corresponding to the storage area, a drain corresponding to a floating diffusion area, and a gate receiving a transmission control signal;
    a reset transistor including a source coupled to the floating diffusion area, a drain coupled to a supply voltage, and a gate receiving a reset control signal;
    a sensing transistor including a source, a drain coupled to the supply voltage, and a gate coupled to the floating diffusion area; and
    a row selection transistor including a drain coupled to the source of the sensing transistor, a gate receiving a row selection signal, and a source outputting the analog signal.

11. The image sensor of claim 1, further comprising:
    an analog-digital conversion unit to convert the analog signal to a digital signal; and
    a control unit to control operations of the signal generation unit, the feedback unit and the analog-digital conversion unit.

12. An image sensor, comprising:
    a pixel array comprising a plurality of unit pixels, each of the unit pixels having a sensitivity associated therewith, the plurality of sensitivities being independent of each other;
    an analog-to-digital converter that is configured to generate digital signals responsive to analog signals generated by the plurality of unit pixels; and a control unit to generate a first control signal and a second control signal, the pixel array generating the analog signals responsive to the first control signal and the analog-to-digital converter generating the digital signals responsive to the second control signal;

wherein the sensitivity is a ratio of a magnitude of the analog signal generated by a respective one of the plurality of unit pixels to an intensity of light incident on the respective one of the plurality of unit pixels; and wherein each of the plurality of unit pixels comprises a feedback unit to increase the sensitivity of the respective one of the plurality of unit pixels when the intensity of the light incident is relatively low and to decrease the sensitivity of the respective one of the plurality of unit pixels when the intensity of the light incident is relatively high.

13. The image sensor of claim 12, wherein each of the plurality of unit pixels comprises a photoelectric conversion unit formed above a substrate and configured to detect the light incident on the respective one of the plurality of unit pixels to generate photo-charges based on a drive voltage generated by the feedback unit.

14. The image sensor of claim 13, wherein the amount of the photo-charges generated from the photoelectric conversion unit is proportional to a magnitude of the drive voltage.

* * * * *